United States Patent
Holmes

(10) Patent No.: US 7,978,746 B2
(45) Date of Patent: Jul. 12, 2011

(54) UNSTABLE LASER DISK RESONATOR

(75) Inventor: Dale A. Holmes, Castaic, CA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 12/109,634

(22) Filed: Apr. 25, 2008

(65) Prior Publication Data

US 2009/0268775 A1 Oct. 29, 2009

(51) Int. Cl.
*H01S 3/06* (2006.01)
*H01S 3/081* (2006.01)

(52) U.S. Cl. ............... 372/67; 359/346; 372/93; 372/95

(58) Field of Classification Search .................. 359/346; 372/67, 93, 95
See application file for complete search history.

(56) References Cited

U.S. PATENT DOCUMENTS

| | | | | |
|---|---|---|---|---|
| 4,039,962 A * | 8/1977 | Hughes | ............ | 359/345 |
| 5,271,031 A * | 12/1993 | Baer | ............ | 372/93 |
| 6,061,377 A | 5/2000 | Brassart et al. | | |
| 6,392,791 B1 * | 5/2002 | Fork et al. | ............ | 359/347 |
| 6,603,793 B2 * | 8/2003 | Vetrovec | ............ | 372/95 |
| 6,813,285 B2 | 11/2004 | Peterson | | |
| 6,847,673 B2 | 1/2005 | Dane et al. | | |
| 6,888,872 B2 * | 5/2005 | Vetrovec | ............ | 372/95 |
| 7,200,161 B2 | 4/2007 | Vetrovec | | |
| 2002/0172253 A1 * | 11/2002 | Vetrovec | ............ | 372/95 |
| 2005/0058162 A1 * | 3/2005 | Nomura et al. | ............ | 372/9 |
| 2005/0058173 A1 * | 3/2005 | Vetrovec | ............ | 372/66 |
| 2006/0209918 A1 * | 9/2006 | Wang et al. | ............ | 372/70 |
| 2007/0248137 A1 * | 10/2007 | Basu | ............ | 372/67 |
| 2008/0304534 A1 * | 12/2008 | Sumida et al. | ............ | 372/67 |
| 2010/0027572 A1 * | 2/2010 | Widen et al. | ............ | 372/33 |

FOREIGN PATENT DOCUMENTS

WO 2009095311 8/2009

OTHER PUBLICATIONS

United Kingdom Patent Office—Combined Search and Examination Report under Sections 17 and 18(3) dated Sep. 1, 2009.

* cited by examiner

*Primary Examiner* — Eric Bolda
(74) *Attorney, Agent, or Firm* — R. Brian Drozd; Moore & Van Allen PLLC

(57) ABSTRACT

An unstable laser disk resonator combines the output laser power of multiple laser disks to produce a high power, single transverse mode laser output beam, which is near diffraction limited.

19 Claims, 8 Drawing Sheets

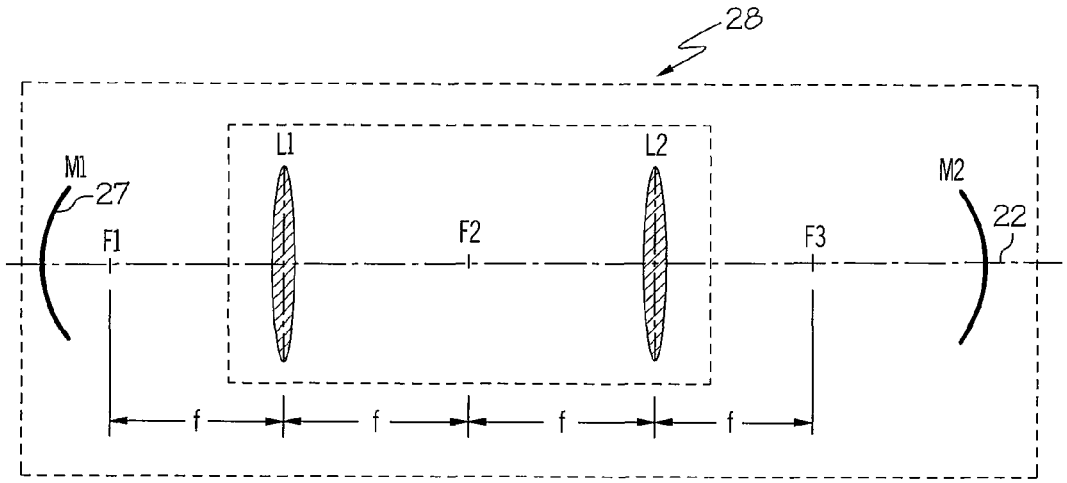
FIG. 8
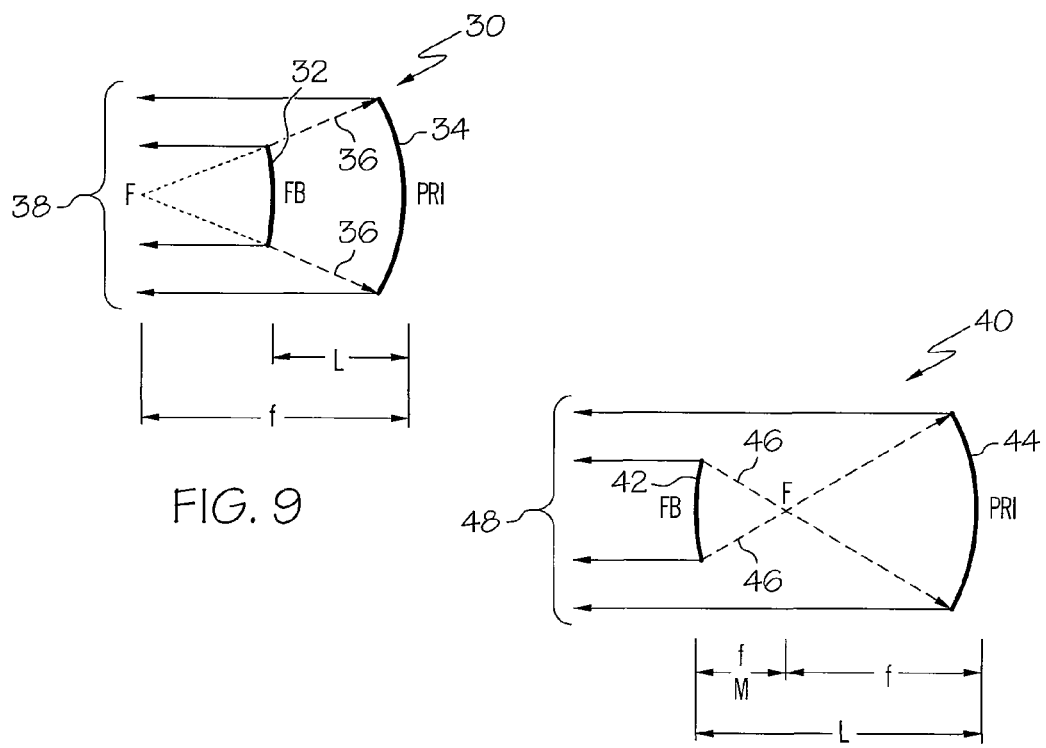
FIG. 9
FIG. 10

# US 7,978,746 B2

UNSTABLE LASER DISK RESONATOR

BACKGROUND OF THE INVENTION

This invention relates to laser resonators, and more particularly to unstable laser resonators for solid state laser disks.

As known in the current state-of-the-art, solid state laser disks have an active thin disk gain medium that is mounted along its back surface to a heat sink. The back surface is highly reflective at the laser and pump wavelengths and the front surface is highly transmissive at the laser and pump wavelengths. An external laser beam enters the disk at its front surface, or "face", propagates to the back surface, is reflected by the back surface back to the front surface, where it leaves the disk. While propagating in the disk, the laser beam extracts energy from the disk.

The energy lost is restored by the pumped laser beam which also enters the disk at its front surface, propagates to the back surface, is reflected and propagates to the front surface where it leaves the disk. While propagating through the disk the pump beam deposits energy into the disk and stimulates the medium. An exemplary active medium is Yb:YAG (ytterbium-doped yttrium aluminum garnet) which is provided in a circular disk format that may be 10 to 1000 millimeter (mm) in diameter and 200 micron (0.20 mm) thick. The pumping light is typically provided by a diode laser array and provides a greater than unity gain at the laser wavelength, so as to have the laser disk function as an active mirror. The pumping beam is presented to the face at an angle of incidence that avoids interference with the laser beam.

While laser disk output beam power may be increased by increasing the pumping laser intensity, it is also known that one can scale up laser disk power by combining multiple laser disks in a stable optical resonator. A stable laser disk resonator is used to combine the individual output laser power of multiple disks into a multi kilowatt laser output beam used, for example, in metal working applications. The high power output beams produced by stable laser disk resonators are multimode, and are typically fifty times diffraction limit. While this is suitable for industrial applications, such as laser welding, it is not suitable for applications which require a more precise and tightly focused beam. It is, therefore, desirable to provide a multiple laser disk resonator that produces a high energy, near diffraction limited laser beam that may be used for more precise laser beam applications.

BRIEF SUMMARY OF THE INVENTION

The present invention is method and apparatus which provides an unstable laser disk resonator that is capable of incorporating multiple laser disks to produce a high power, near diffraction limited laser beam suitable for use in precise laser applications.

According to the invention, one or more imaging systems are embedded within the optical cavity of an unstable resonator which has a feedback mirror and a primary mirror located at opposite ends of an optical axis, each imaging system comprising a laser disk and a reflecting mirror arranged in pairs along the optical axis to position the reflecting surfaces of each in separate laser disk and reflecting mirror image planes that are mutually spaced apart along the optical axis, the imaging systems providing full self imaging of the laser signal from each laser disk onto the laser disk of an adjoining 1:1 imaging system.

In further accord with the invention, the spherical reflecting surfaces of the laser disks and associated reflecting mirrors have the same radius of curvature (ROC), which is equal to the spacing of their respective laser disk and reflecting mirror image planes to make each 1:1 imaging system confocal.

In still further accord with the invention, the laser disk and reflecting mirror of each imaging system are obliquely disposed with respect to each and adjoining imaging systems are relatively disposed along the optical axis in a W configuration.

In yet still further accord with the invention, each imaging system comprises a pair of laser disks mutually arranged along the optical axis in oblique relation, with the reflecting surface of each in an associated one of two disk image planes which are relatively spaced to make each imaging system confocal.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 8, is a simplified illustration of a rearrangement of the configuration illustrated in FIG. 7;

FIG. 9, is a simplified schematic illustration of a first type of unstable resonator with which the present invention may be used;

FIG. 10, is a simplified schematic illustration of a second type of unstable resonator with which the present invention may be used;

DETAILED DESCRIPTION OF THE INVENTION

Figure 1:
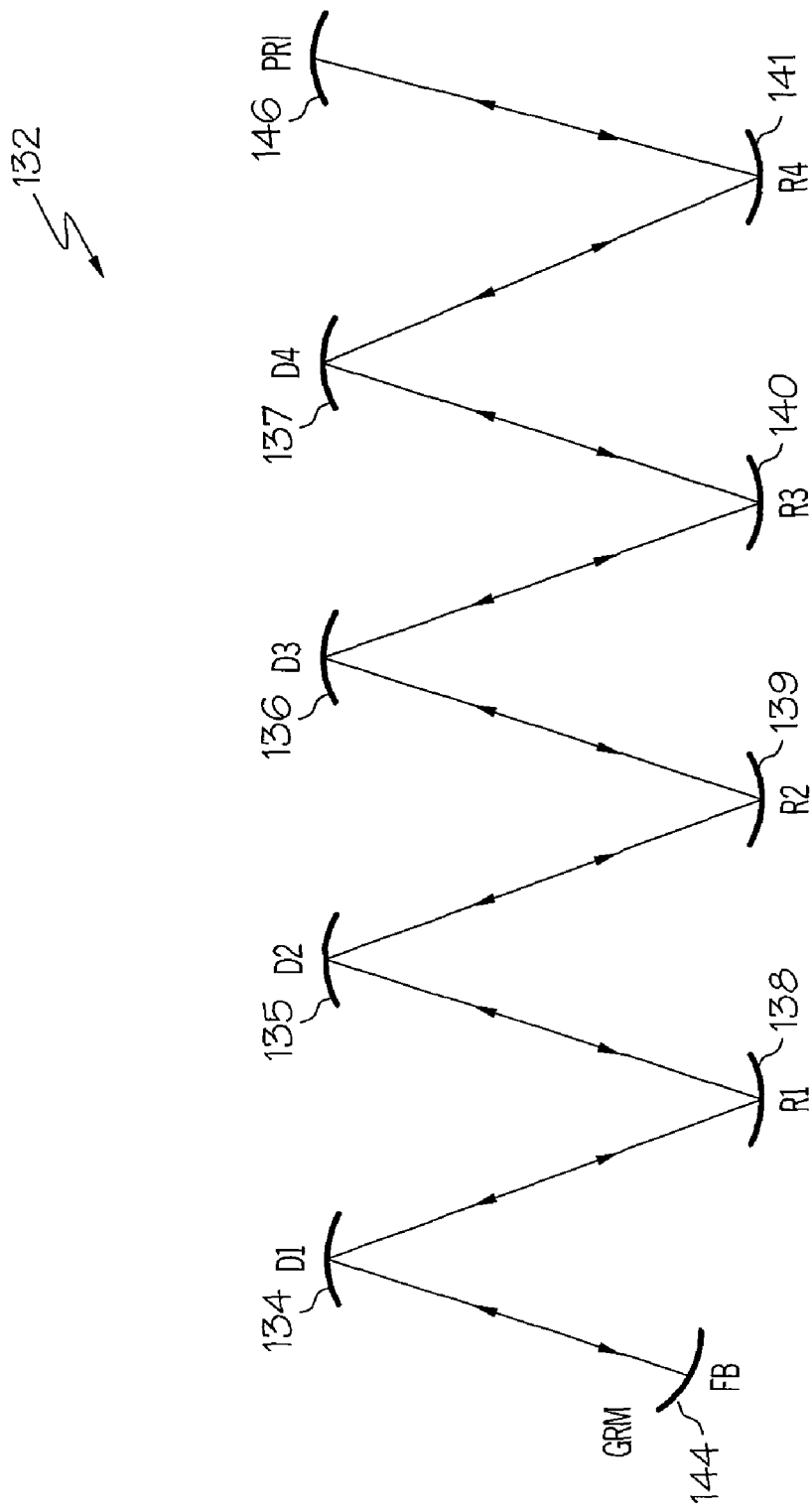
FIG. 1, is a schematic illustration of an exemplary embodiment of the invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, portions of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage devices; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is to the method and apparatus for creating a single multi kilowatt, single transverse mode, near diffraction limited output laser beam from an array of N laser disks. To provide the multi kilowatt output power beam in a single transverse mode it is necessary to use an unstable resonator where the laser output is provided from the edge of the feedback mirror. Single mode stable resonators cannot be used with the larger diameter, e.g., 1 cm, high power disks because the fundamental mode diameter for practical stable resonators is only 1 or 2 mm in diameter.

Figure 5:
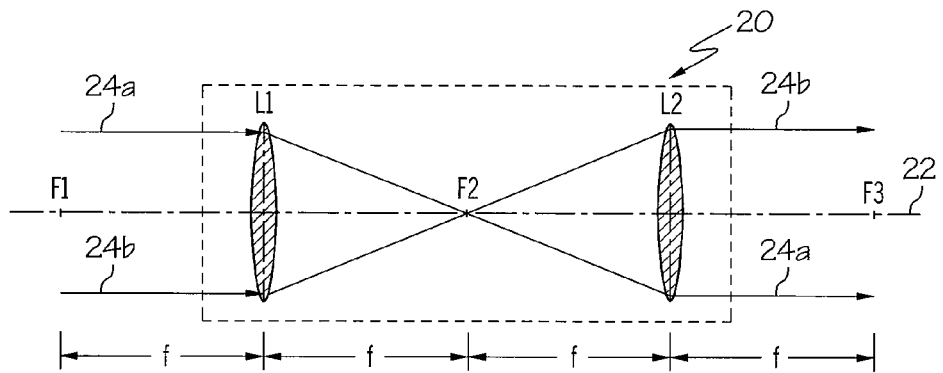
FIG. 5, is an illustration of a 1:1 imaging system that is used in teaching the invention.

To provide a near diffraction limit, single transverse mode laser the laser disks are disposed with associated reflecting mirrors in the unstable resonator in a manner such that each laser disk and reflecting mirror combination functions as a 1:1 imaging system. This also provides full imaging of each laser disk output onto the adjoining laser disks. This provides a single transverse mode resonator, as well as provides for efficient disk power extraction. To achieve this the laser disks and reflecting mirrors are arranged so that the spherical mirror surfaces of each are positioned in respective laser disk and reflecting mirror image planes that are mutually spaced at a selected image distance over the extent of their placement along the optical axis. As described in further detail below, each laser disk-reflecting mirror combination provides a 1:1 imaging system To teach the principals involved in placing imaging systems within optical resonators, reference is first made to FIGS. 5 through 8. FIG. 5 illustrates a 1:1 imaging system 20 having identical positive lenses L1 and L2. The lenses each have focal length f and, as placed on the optical axis 22, they have a common focal point F2. The 1:1 imaging system 20 images all objects with unity magnification, so an electromagnetic field 24a, 24b with complex amplitude u(x, y) in the object plane F1 is simply relayed by the system 20 to the image plane F3 with complex amplitude u(−x,−y). The relay is essentially a zero optical distance propagation and a 180-degree rotation. The physical length of the 1:1 imaging system 20 is 4f but its optical length is zero.

Figure 6:
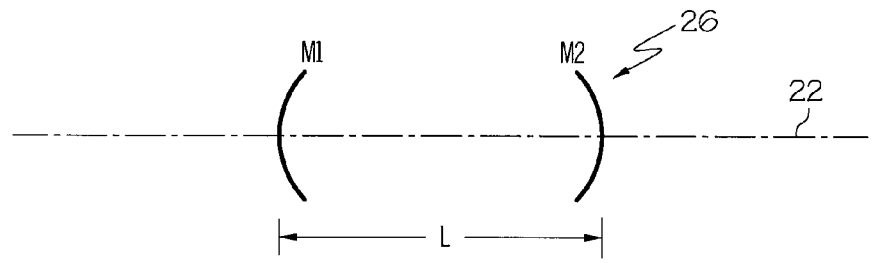
FIG. 6, is a simplified illustration of a general resonator that is used in teaching the invention.
Figure 7:
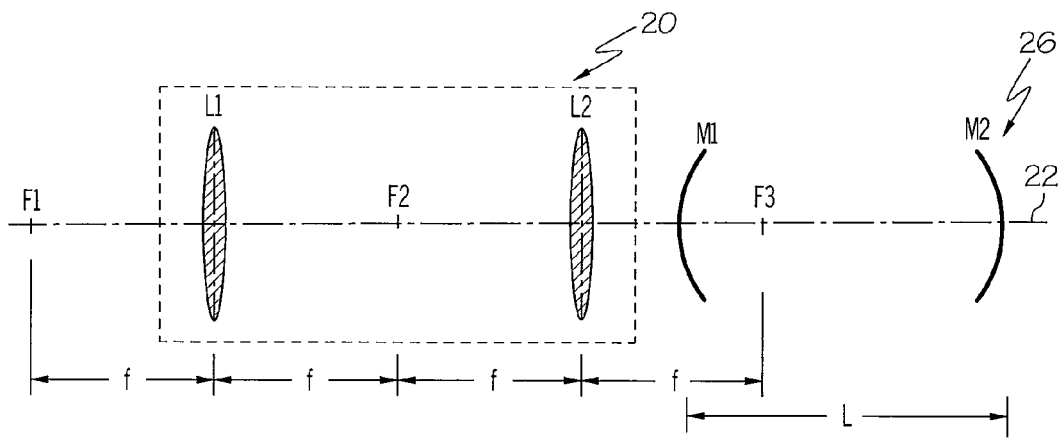
FIG. 7, is a simplified illustration of an imaging system and a resonator that is used in teaching the invention.

FIG. 6 illustrates an arbitrary two-mirror resonator 26 shown with concave end mirrors M1 and M2 with separation L. The resonator 26 may be placed on the optical axis 22 of the imaging system 20, as shown in FIG. 7. In FIG. 8, the mirror M1 is then moved leftward by a distance 4f to a relocated image location 27, which provides the optical resonator 26 with the 1:1 imaging system 20 imbedded inside, to form an imaging optical resonator 28. This imaging optical resonator 28 is basically identical to the resonator 26 (FIG. 6) in bare cavity performance, while differing in hardware. That is, the bare cavity fields at mirrors M1 and M2 are virtually identical for the resonator 26 and the imaging resonator 28, as are the magnitudes of the bare cavity eigenvalues. The insertion of the 1:1 imaging system 20 does not alter the essential features of the resonator's output laser beam. If the resonator 26 (FIG.

6) is designed for a desired resonator performance, e.g., good transverse mode discrimination, the imaging resonator 28 will possess these same desired properties. To obtain this performance, one must be certain that lenses L1 and L2 do not significantly aperture the intracavity beam in propagation through the 1:1 imaging system.

Therefore, the process for inserting a 1:1 imaging system inside any resonator is to choose a point on the optical axis of the resonator. Take all resonator optical elements to the left of this point and move them leftward by a distance 4f, then insert the 1:1 imaging system with physical length 4f into the vacant space provided. The imaging resonator formed will possess all of the bare cavity performance attributes of the original resonator. This process can be extended to creating an imaging resonator system having N number of cascaded 1:1 imaging systems, by vacating a space equal to N4f, and the new resonator formed will possess the bare cavity performance attributes of the original parent resonator.

Two types of unstable resonator which may be used with the present invention are shown schematically in FIGS. 9 and 10. FIG. 9 is a positive branch unstable resonator 30, having a spherical convex feedback mirror (FB) 32 and a spherical concave primary mirror (PRI) 34. The light 36 reflected by feedback mirror 32 appears to be coming from the focal point F. The light 36 is collimated upon reflection from the primary mirror 34 to produce a collimated annular output laser beam 38 around the feedback mirror 32. The feedback and primary mirrors 32, 34 share a common focus F so that the resonator 30 is a confocal unstable resonator.

The diameter of the feedback mirror 32 is 2 a and that of the primary mirror is 2 Ma, or greater, where M>1 and is the resonator magnification. The focal length of the primary mirror 34 is f. This is M times the focal length of the feedback mirror 32, which equals f/M. The distance between the mirrors 32, 34 is $L=f(M-1)/M$.

FIG. 10 is a negative branch unstable resonator 40 having spherical concave feedback mirror (FB) 42 and spherical concave primary mirror (PRI) 44. The light 46 reflected by feedback mirror 42 is focused at focal point F and collimated upon reflection from the primary mirror 44 to produce a collimated annular output laser beam 48 around the feedback mirror 32. The feedback and primary mirrors 32, 34 share a common focus F so that resonator 40 is a confocal unstable resonator. The primary mirror 44 has a focal length f and the feedback mirror 42 has a focal length f/M, where M>1 is the magnification of the unstable resonator. The mirrors are separated by a distance $L=f(M+1)/M$.

Figure 11:
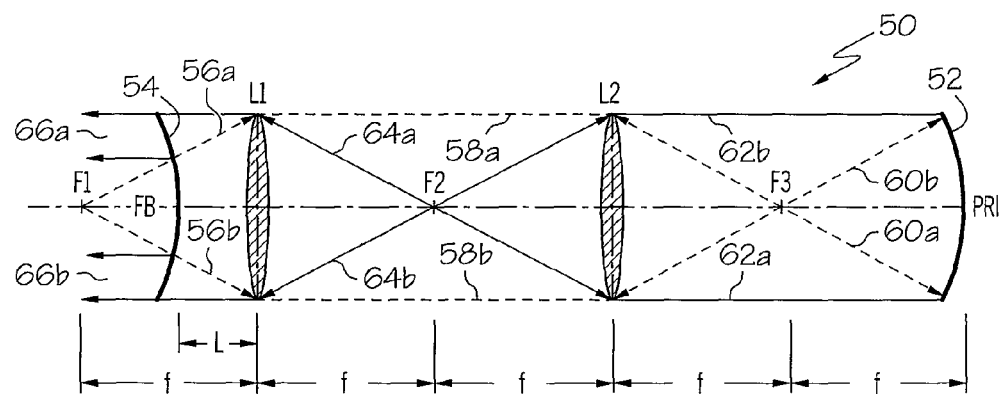
FIG. 11, is a simplified illustration used in teaching the principal of operation of the invention as embodied in the resonator of FIG. 9.
Figure 12:
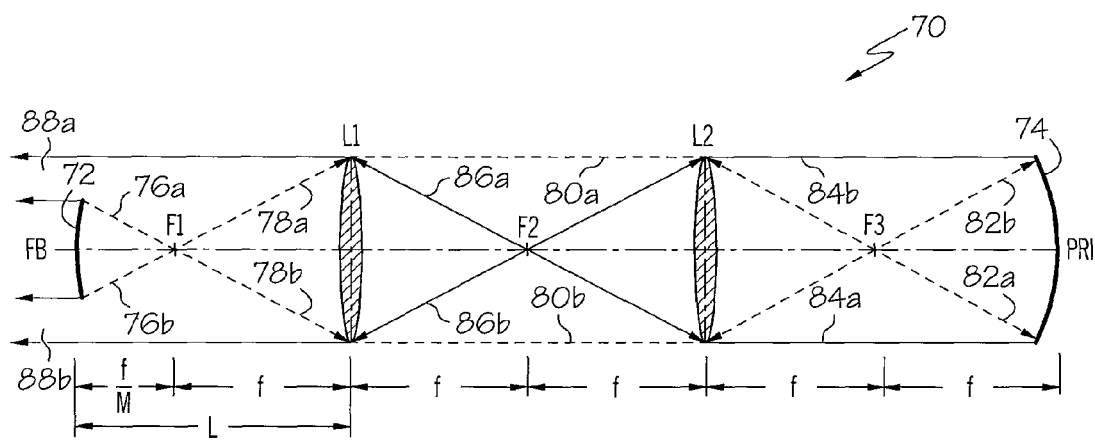
FIG. 12, is a simplified illustration used in teaching the principal of operation of the invention as embodied in the resonator of FIG. 10.

The resonators 30 and 40 are shown in FIGS. 11 and 12 with the 1:1 imaging system 20 of FIG. 5 imbedded within them. For illustrative purposes only, and with no limitations inferred, the imaging resonators of FIGS. 11, 12 are shown with the feedback mirrors and lens L1 having a common focus F1 and the primary mirrors and lens L2 having a common focus F3. Also for convenience the focal length of the primary mirrors is f and that of the feedback mirrors is f/M. This makes the intracavity beam sizes on L1, L2 and the primary mirrors to all have a diameter 2 Ma (where M again is the magnification and a is the diameter of the feedback mirrors); this is true for both the feedback pass and the output pass. If the resonators of FIGS. 9 and 10 possess good transverse mode discrimination and produce near diffraction limited output beams, then the imaging resonators of FIGS. 11 and 12 will do likewise.

Referring to FIG. 11, which is an unstable, positive branch imaging resonator (PBIR) 50. The lenses L1, L2 and the spherical concave primary mirror 52 all have focal lengths f and are separated by 2f. The spherical convex feedback mirror 54 has focal length f/M, and is located a distance L from L1. Once again, $L=f(M-1)/M$, where M>1 is the magnification of the resonator 50. When the collimated output beam is reflected by feedback mirror FB, the reflected light becomes a diverging beam 56a, 56b which appears to come from F1.

We will now follow this beam for one round trip with the reflected beam illustrated by dashed lines and the return, or forward beam, shown in solid. When the beam 56a, 56b reaches L1 it is then collimated 58a, 58b and lens L2 focuses the beam at F3 so that it is diverging 60a, 60b as it reaches the primary mirror 52. The primary mirror reflects it as a collimated beam 62a, 62b, which is then focused by lens L2 at F2 and it is diverging 64a, 64b when incident on lens L1, which then collimates it as output beam 66a, 66b. When the collimated beam reaches feedback mirror 54 it has completed an entire round trip. In making the round trip the beam has passed through focus twice (at F3 and F2), and the even number of intracavity foci characterizes the resonator 50 as being an unstable, positive branch imaging resonator (PBIR). A PBIR will always have an even number of intracavity foci.

FIG. 12 is a negative branch imaging resonator (NBIR) 70, with a spherical concave feedback mirror 72 and a spherical concave primary mirror 74. As described above, the lenses L1, L2 and the primary mirror 74 all have a focal length f and are separated by 2f. The feedback mirror 72 has a focal length f/M and is located a distance L from L1. Once again $L=f(M+1)/M$, where M>1 and is the magnification of the unstable resonator. When the collimated beam impinges on feedback mirror 72 it is reflected. It becomes a converging beam 76a, 76b as it passes through focus at F1, and is diverging 78a, 78b when incident at lens L1.

We will now follow this beam for one round trip. When the beam 78a, 78b reaches L1 it is then collimated 80a, 80b and then focused by lens L2 at F3 so that it is diverging 82a, 82b when it reaches the primary mirror 74. This completes the feedback pass, and the primary mirror reflects the beam as a collimated beam 84a, 84b. Lens L2 focuses the beam at F2 so that it is diverging 86a, 86b when incident at lens L1, which then collimates it into output beam 88a, 88b. When the collimated beam reaches FB it has completed the output pass as well as the entire round trip. In making the round trip, the beam has passed through focus three times (at F1, F3, and F2), and the odd number of intracavity foci characterizes resonator 70 as an unstable, negative branch imaging resonator (NBIR). An NBIR will always have an odd number of intracavity foci.

The above descriptions in respect of FIGS. 5-12 illustrated the principals involved in embedding a 1:1 imaging system into an unstable resonator to provide both an NBIR and a PBIR type unstable resonator, either of which is applicable to the present invention. The following embodiments are exemplary of a 1:1 imaging system that substitutes a laser disk for one or both of the imaging system lenses L1 and L2 of FIGS. 5-8 and 11, 12. Although this teaching is provided in terms of an unstable NBIR it should be understood that an unstable PBIR is equally applicable, and that comparable embodiments can be made for the PBIR.

Figure 3:
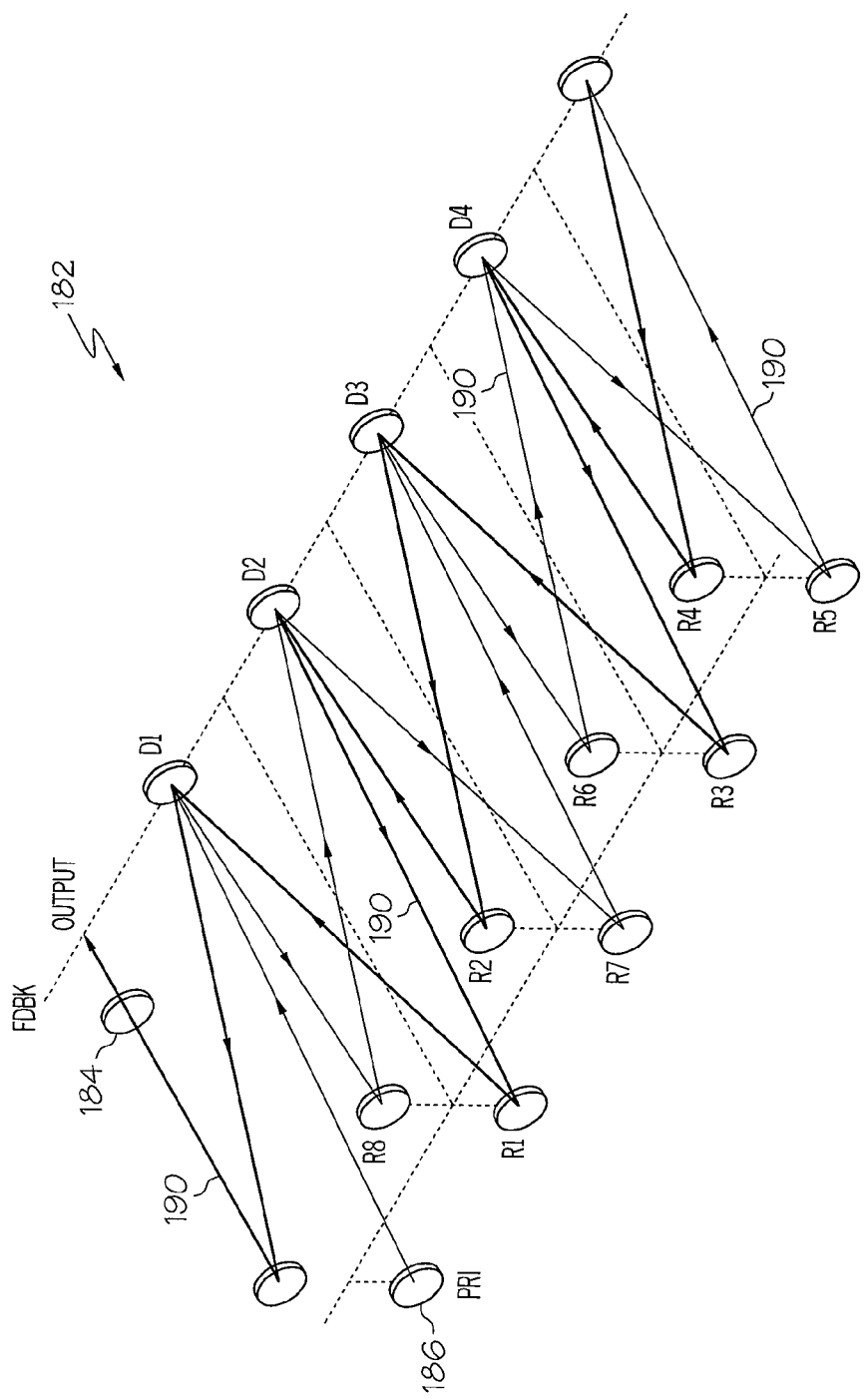
FIG. 3, is a schematic illustration of a further alternative exemplary embodiment of the invention.
Figure 13:
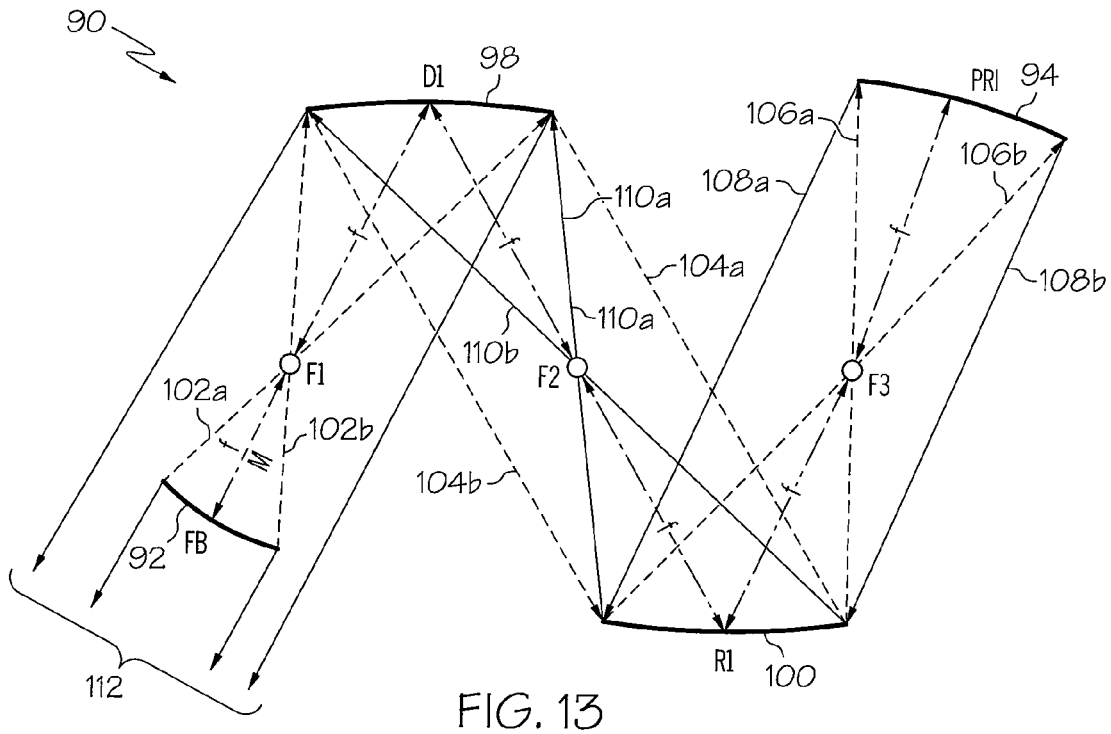
FIG. 13 is a schematic illustration of a still further alternative exemplary embodiment of the invention.

Referring now to FIG. 1 3, which illustrates an unstable NBIR 90 having as end mirrors a spherical concave feedback mirror 92 and spherical concave primary mirror 94. The end mirrors are disposed in the resonator cavity, at opposite ends of the resonator optical axis 96. A 1:1 imaging system, consisting of concave mirrors D1 (98) and R1 (100) sequentially arranged along the optical axis, is imbedded between the end mirrors 92, 94. The mirrors D1 and R1 form the 1:1 imaging system and replace the lenses L1 and L2 of the earlier imaging systems described with respect to FIGS. 11 and 12. Both of these mirrors have a focal length f and are separated by a distance 2f as shown in FIG. 13. In this embodiment the primary mirror 94 also has a focal length f and the feedback mirror 92 has a focal length f/M, where M>1 is the resonator magnification, hence, the unstable imaging resonator is confocal.

In this embodiment the concave mirror D1 (98) is a laser disk and R1 is a relay mirror. Prior art laser disks, such as the Yb:YAG doped thin laser disks available from TRUMPF GMBH & CO., Ditzingen, GERMANY function as spherical concave mirrors having an optical gain, i.e. "active mirrors". These laser disks are typically less than 0.22 mm thick, with a disk diameter that is typically one centimeter. The concave front surface of the disk can possess a typical radius of curvature (ROC) of two meters, and they are pumped from the front by pump light from a diode laser stack that is incident on the disk front surface at an angle of incidence that does not obstruct the main Yb:YAG laser beam. The opposite side, or back surface of the disk is mounted to a heat sink.

The diameters of the reflecting mirror R1 (100) and the disk D1 (98) are greater than 2 Ma, and the two have the same radius of curvature. The pumped diameter on the disk D1 is approximately 2 Ma. If the focal length f=1/2 ROC, then the separation is ROC and the NBIR 90 is confocal. The R1 mirror and D1 disk are sequentially arranged in an oblique relationship with each other along the optical axis, as are all elements of the NBIR 90. The angle of obliqueness is selected to have a different angle of incidence at the surface of D1 than the laser disk pumping light, and is otherwise as near orthogonal as is permitted by the sequential arrangement of the optical elements so as to minimize laser beam astigmatism and to provide full imaging of the laser light through the 1:1 imaging system.

We again follow the laser beam in a round trip of the NBIR 90, where the return light reflected from the feedback mirror 92 is shown dashed and the forward path light is in solid. The light 102a, 102b reflected from feedback mirror 92 converges to focal point F1 and is diverging when incident on D1. D1 collimates the beam 104a, 104b as incident at R1, which focuses the beam at F3 where it diverges 106a, 106b as incident at primary mirror 94. The primary mirror collimates the beam 108a, 108b and presents it to R1 which focuses it at focal point F2 and it is divergent 110a, 110b at D1. D1 then collimates the light as output beam 112. The round trip beam is sequentially focused at F1, F3 and F2, and the odd number of intracavity foci characterizes the resonator as a negative branch imaging resonator.

As described above, the 1:1 imaging systems may equally be embedded in PBIR configurations although NBIR configurations provide the added benefit of being less alignment sensitive. Similarly, in the embodiment of FIG. 13 and in each of the embodiments to follow, the positions of the laser disks and reflecting mirrors could be interchanged, and it is also possible to replace the reflecting mirrors themselves with laser disks so that the optical elements of the 1:1 imaging system may both be laser disks.

Figure 14:
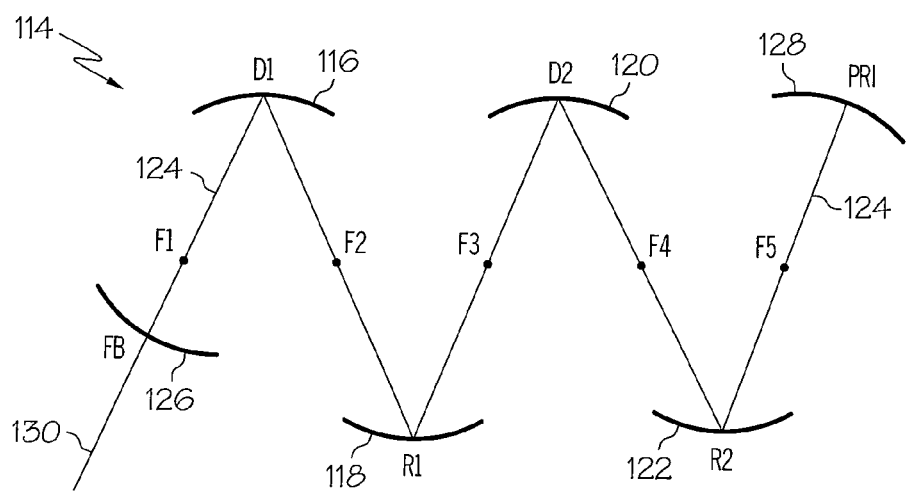
FIG. 14 is a schematic illustration of a yet still further alternative exemplary embodiment of the invention.

FIG. 14 is an NBIR 114 having two cascaded 1:1 imaging systems imbedded within the resonator. This includes D1 (116) and R1 (118) and D2 (120) and R2 (122), all with focal length f, which are mutually spaced a distance 2f apart. The imaging systems are sequentially arranged in an oblique manner along the NBIR optical axis 124 between a feedback mirror 126 and a primary mirror 128. The primary mirror 128 has a focal length f and the feedback mirror has a focal length f/M where M>1 is the resonator magnification, and the NBIR 114 is confocal.

To avoid complexity in illustration the beam propagation of this six element NBIR 114 is shown with a single line (the optical axis of the resonator). As understood the NBIR output beam 130 is collimated and the light reflected from the feedback mirror is a converging beam that is focused at F1. The reflected light is then focused at F3 and F5 in its reverse (feedback) path and at F4 and F2 in its forward (output) path for a total five foci.

As may be seen from the embodiments of FIGS. 13 and 14 the essential features of the output laser beam are independent of the number of 1:1 imaging systems that are cascaded and imbedded within the resonator. Therefore, the invention allows scaling which permits incorporation of as many laser disks as necessary to satisfy functional requirements, such as output power, subject to physical limitations on size and weight.

In such scaling, all disks are imaged on each other and all relay mirrors are imaged upon each other. The focal lengths f and spacing 2f are chosen to provide an intracavity resonator beam that has the same diameter on all of the laser disks on both the feedback pass and the output pass. This is highly desirable for efficient power extraction from the laser disks.

Referring now to FIG. 1, which illustrates the scaling capability of the invention with an NBIR 132 having four laser disks D1-D4 (134-137) in combination with four reflecting mirrors R1-R4 (138-141) disposed in a multiple W configuration along the resonator optical axis between the resonator feedback mirror 144 and primary mirror 146. As with the preceding embodiments the spherical mirror surfaces of the laser disk and associated reflecting mirror have equal ROC and focal lengths f and are spaced a distance ROC apart so that the imaging systems and the NBIR are confocal.

In the unstable laser disk resonator embodiments of FIGS. 13 and 14 the feedback mirrors were assumed to be finite aperture mirrors of diameter 2a, where the collimated output laser beam is provided around the edge of the mirror. As is often done in the applications of unstable resonators, the output beam can also be taken with a scraper mirror, which is simply a planar mirror with a central hole of diameter 2a. The scraper mirror would be placed between FB and D1 in FIGS. 13 and 14, and between FB and D1 in FIG. 1. When using a scraper mirror, it can often be placed at F1 so that the Equivalent Fresnel Number (Neq) is infinite, thus ensuring excellent mode control.

In FIG. 1 the feedback mirror of the NBIR 132 is shown as a Graded Reflectivity Mirror (GRM) which itself passes a portion of the output laser beam and reflects the remainder back into the cavity. The use of a GRM enhances the resonator's transverse mode discrimination and reduces diffractive ringing inside the resonator. The reflectivity (R(r)) of the GRM type feedback mirror is given by:

$$R(r) = R_o \exp(-2(r/a)^n), \text{ where } n \text{ is an integer and } R_o < 1.$$

Also when using a GRM, the unstable laser disk resonator exhibits a finite Equivalent Fresnel Number, but it is generally large enough to ensure good mode control.

Figure 4:
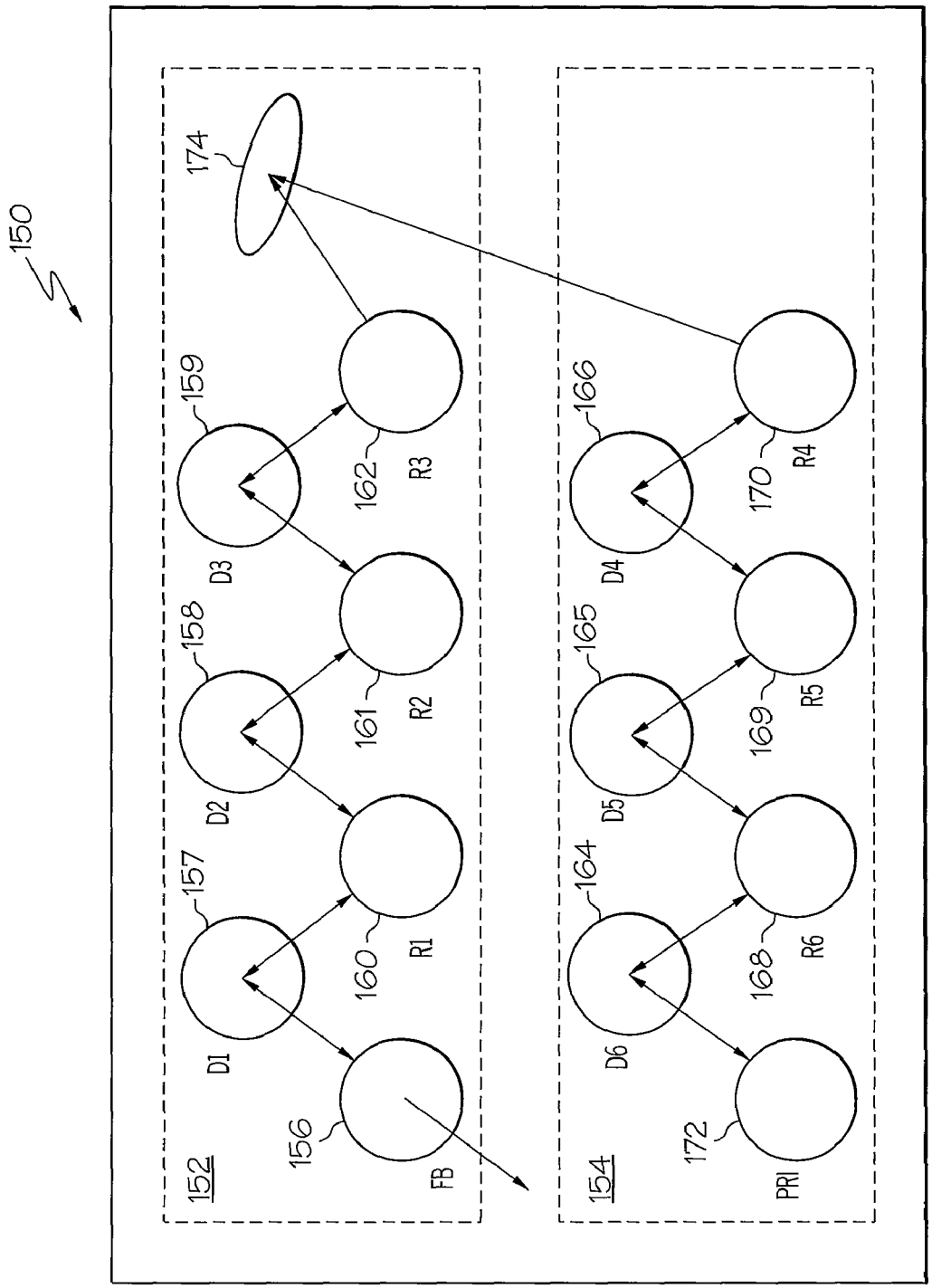
FIG. 4, is a figurative illustration used in the description of certain features of the invention.

In each of the resonator embodiments shown the laser system is shown to lie in a single plane, however, the present invention also applies to three dimensional resonator configurations. FIG. 4 is a figurative illustration of an unstable laser disk resonator 150 which has two tiers 152, 154, as may be necessary for a given product mechanical design. The first tier 152 has the resonator feedback mirror 156, laser disks D1-D3 (157-159), and reflecting mirrors R1-R3 (160-162). The second tier 154 has laser disks D4-D6 (164-166), reflecting mirrors R4-R6 (168-170), and primary mirror 172. Coupling mirror 174 transfers the intracavity laser beam between the two tiers. This can be repeated for as many tiers as are necessary.

In the embodiments described above, the resonator optical axis makes a single vee intersection with each laser disk and the intracavity beam reflects from each disk two times in one round trip. To improve transverse mode control or output beam properties, a double vee, or higher order vee optical axis intersection with each disk may be used.

Figure 2:
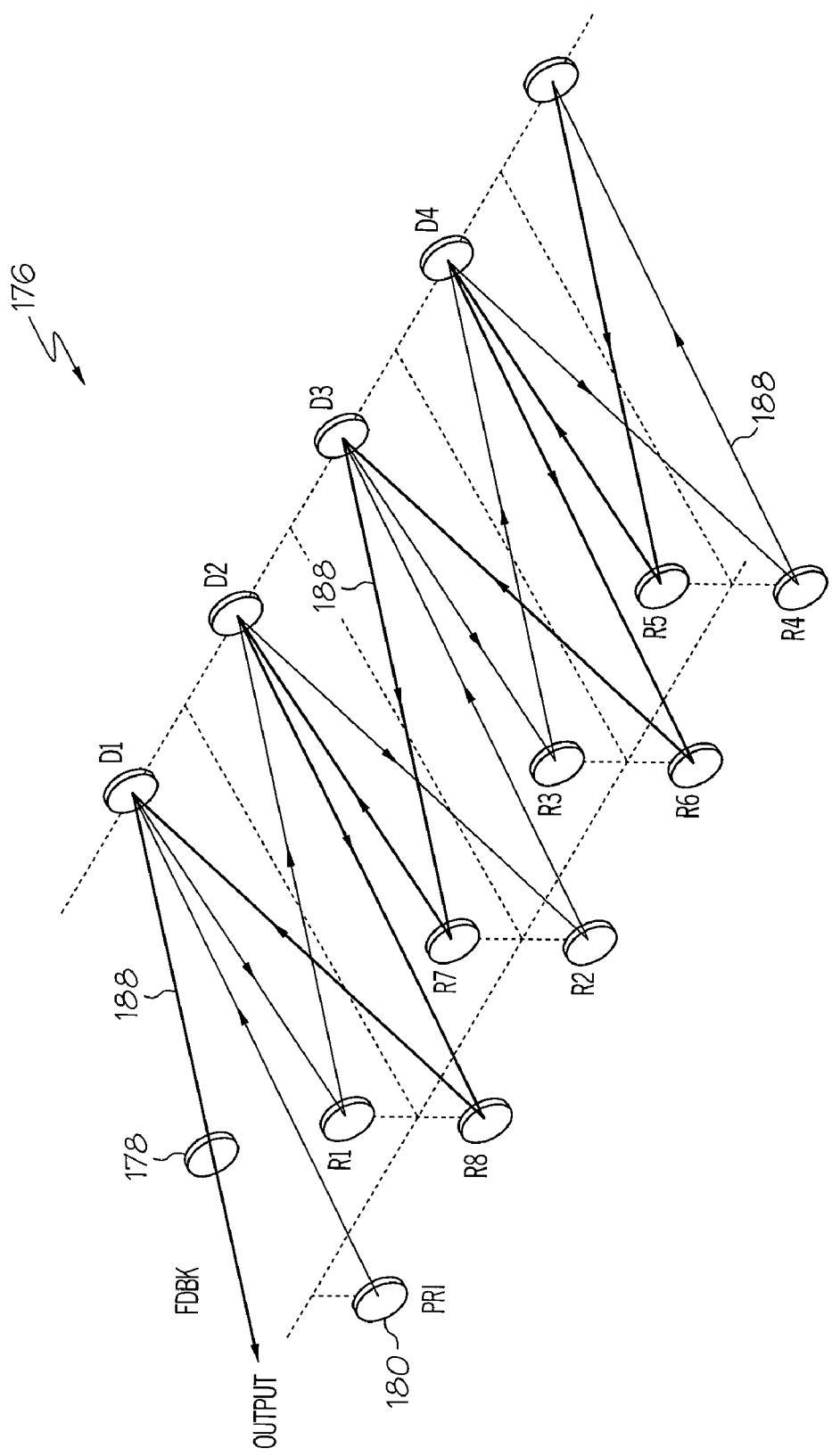
FIG. 2, is a schematic illustration of an alternative exemplary embodiment of the invention.

Some typical double vee embodiments are shown in FIGS. 2 and 3. In FIG. 2 is shown a 4-disk NBIR 176 with a convex feedback mirror 178 and a concave primary mirror 180 in a three dimensional structure. In FIG. 3 is shown a 4-disk NBIR 182 with a concave feedback mirror 184 and a concave primary mirror 186 in a three dimensional structure. The line 188 (FIG. 2) and 190 (FIG. 3) is the optical axis of the resonator, and the arrows depict the light propagation direction for the output pass. In these double vee architectures, the intracavity beam reflects from each disk four times in one round trip. It will now be shown how the double vee configuration can be used to enhance mode control and enhance output beam features.

The feedback mirror reflects a fraction of the power incident upon it. This fraction is known as the feedback ratio (FBR). In the geometric optics approximation, $FBR_0=1/M^2$ for the dominant transverse mode and $FBR_1=1/M^4$ for the next higher order transverse mode. M is the resonator magnification. It is desirable to make $[FBR_0-FBR_1]/FBR_0$ as large as possible to ensure good mode control, hence, it is desirable to operate with as large an M value as possible. As another point, the output beam is an annulus of inner diameter 2a and outer diameter 2 Ma. Operating with a large M is desirable because more of the near-field power is placed in the central lobe of the far-field diffraction pattern as M increases. The double vee configuration allows M to be larger while maintaining power extraction efficiency. This will now be illustrated.

Assume the beam diameter at the disk is d and the disk thickness is t. When the resonator beam propagates within the disk and extracts power from the disk, the laser medium gain coefficient is reduced to g by saturation effects. To avoid deleterious effects owing to amplified spontaneous emission, the gd product must be maintained at acceptably low levels, typically one or two. The steady state threshold condition for the single vee configuration with N disks is $(FBR_0)\exp(4gNt)=1$, hence, the required M value is given by $M=[\exp(gd)]^{2Nt/d}$. The steady state threshold condition for the double vee configuration is $(FBR_0)\exp(8gNt)=1$ or the required M value is given by $M=[\exp(gd)]^{4Nt/d}$. Hence, it is clear, that for a given required value of gd, M can be larger for the double vee configuration. At a given value of gd, power extraction is maintained, so the double vee configuration allows operation at larger M without sacrificing power extraction efficiency.

The flowcharts and block diagrams in the Drawing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The present invention is to an unstable laser disk resonator having one or more 1:1 imaging systems embedded in an optical resonator that is originally designed to produce a single transverse mode with a near diffraction limited, output beam. The 1:1 imaging systems may include a laser disk whose reflecting surface is concave and is placed in confocal relationship with that of a reflecting mirror. It may alternatively include two laser disks in confocal relationship. When several 1:1 imaging systems are embedded in the resonator, that resonator still produces a single transverse mode with a near diffraction limited, output beam while also efficiently extracting power from each disk. The multidisk configuration also images one laser disk output signal onto adjacent laser disks.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An unstable laser disk resonator for providing a near diffraction limited output laser signal, comprising:
    an optical cavity having an optical axis;
    end mirrors disposed at opposite ends of the optical axis, including a primary mirror and a feedback mirror, for providing unstable resonator oscillation of a laser signal propagating between them; and
    laser disks disposed jointly with associated reflecting mirrors, sequentially along the optical axis, the laser disks and reflecting mirrors each having a concave spherical mirror surface which in combination provide one or more 1:1 imaging systems between the feedback mirror and the primary mirror, each 1:1 imaging system providing full self imaging of each laser disk signal onto each adjoining laser disk, and at least one of the one or more 1:1 imaging systems comprises a first laser disk and a reflecting mirror that are positioned to be substantially confocal.

2. The unstable laser disk resonator of claim 1, wherein the spherical mirror surfaces of the sequentially disposed laser disks and the reflecting mirrors are positioned in respective laser disk and reflecting mirror image planes that are mutually spaced at a selected image distance over the extent of their disposition along the optical axis.

3. The unstable laser disk resonator of claim 2, wherein the spherical mirror surfaces of the disposed laser disks and the reflecting mirrors have substantially the same radius of curvature.

4. The unstable laser disk resonator of claim 3, wherein the selected image distance between the laser disk and the reflecting mirror image planes is equal to the sum of the focal lengths of the spherical mirror surfaces of the laser disk and associated reflecting mirror.

5. The unstable laser disk resonator of claim 4, wherein the focal lengths of the laser disk and associated reflecting mirror spherical mirror surfaces are equal, and each of the 1:1 imaging systems are confocal.

6. The unstable laser disk resonator of claim 5, wherein the associated reflecting mirrors are also laser disks.

7. The unstable laser disk resonator of claim 5, wherein the laser disks and associated reflecting mirrors are arranged in a collective W configuration along the optical axis.

8. The unstable laser disk resonator of claim 5, wherein the optical cavity comprises two or more cavity levels, including a first cavity level having the feedback mirror and a last cavity level having the primary mirror, each cavity level having laser disks and associated reflecting mirrors arranged in W configurations to provide one or more imaging systems thereon, and all cavity levels further including such number of light coupling mirrors as necessary to provide inter-level coupling of the resonator's oscillating laser signal between the feedback mirror and the primary mirror.

9. The unstable laser disk resonator of claim 5, wherein the 1:1 imaging systems and the optical cavity end mirrors provide a negative branch imaging resonator (NBIR).

10. The unstable laser disk resonator of claim 5, wherein the 1:1 imaging systems and the optical cavity end mirrors provide a positive branch imaging resonator (PBIR).

11. A method of making an unstable laser disk resonator for providing a near diffraction limited output laser signal, comprising the steps of:
providing an optical cavity having an optical axis;
disposing end mirrors in the optical cavity, at opposite ends of the optical axis, the end mirrors including a primary mirror and a feedback mirror, which together provide unstable resonator oscillation of a laser signal propagating between them; and
arranging laser disks jointly with associated reflecting mirrors in the optical cavity, sequentially along the optical axis, the laser disks and reflecting mirrors each having a concave spherical mirror surface which in combination provide one or more 1:1 imaging systems between the feedback mirror and the primary mirror, each 1:1 imaging system providing full self imaging of each laser disk signal onto each adjoining laser disk; and
positioning the spherical mirror surfaces of the laser disks and of the reflecting mirrors so that the focal length of the laser disk spherical mirror surface are substantially equal that of the associated reflecting mirror, whereby each of the 1:1 imaging systems are substantially confocal.

12. The method of claim 11, wherein the step of arranging the laser disks jointly with associated reflecting mirrors along the optical axis further includes:
positioning the spherical mirror surfaces of the sequentially arranged laser disks and reflecting mirrors in respective laser disk and reflecting mirror image planes that are mutually spaced at a selected image distance over the extent of their disposition along the optical axis.

13. The method of claim 11, wherein the step of positioning further comprises:
fabricating the spherical mirror surfaces of the laser discus and of the reflecting mirrors with substantially the same radius of curvature.

14. The method of claim 13, wherein the step of positioning further comprises:
setting the selected image distance equal to the sum of the focal lengths of the spherical mirror surfaces of a laser disk and its associated reflecting mirror.

15. The method of claim 11, wherein the associated reflecting mirrors are also laser disks.

16. The method of claim 11, wherein the laser disks and associated reflecting mirrors are arranged in a collective W configuration along the optical axis.

17. The method of claim 11, wherein the step of providing an optical cavity comprises:
creating two or more cavity levels, including a first cavity level having the feedback mirror and a last cavity level having the primary mirror, each cavity level having laser disks and associated reflecting mirrors arranged in W configurations to provide one or more imaging systems thereon, and all cavity levels further including such number of light coupling mirrors as necessary to provide inter-level coupling of the resonator's oscillating laser signal between the feedback mirror and the primary mirror.

18. The method of claim 11, further comprising the step of:
configuring the 1:1 imaging systems and the optical cavity end mirrors to provide a negative branch imaging resonator (NBIR).

19. The method of claim 11, further comprising the step of:
configuring the 1:1 imaging systems and the optical cavity end mirrors provide a positive branch imaging resonator (PBIR).

* * * * *